US005975466A

United States Patent [19]

Kahara et al.

[11] Patent Number: 5,975,466

[45] Date of Patent: Nov. 2, 1999

[54] VARIABLE DISPLACEMENT FUEL TANK FOR AIRCRAFT

[75] Inventors: Bryan D. Kahara, Costa Mesa; Richard T. Priestley, LaQuinta; Kenneth E. Seho, Garden Grove, all of Calif.

[73] Assignee: Northrop Grumman Corporation, Los Angeles, Calif.

[21] Appl. No.: 09/089,103

[22] Filed: Jun. 2, 1998

[51] Int. Cl.[6] .................. B64D 37/02

[52] U.S. Cl. .................. 244/135 R; 244/135 B; 244/130

[58] Field of Search .................. 244/219, 117 R, 244/119, 120, 135 R, 135 B; 220/562, 723, 4.12, 4.14, 4.15, 4.16, 6, 9.2, 9.3, 905; 222/95, 103, 105, 107

[56] References Cited

U.S. PATENT DOCUMENTS

| | | | |
|---|---|---|---|
| 2,349,858 | 5/1944 | Gillmor | 244/219 |
| 2,432,025 | 12/1947 | Lorenz | 244/135 B |
| 2,777,656 | 1/1957 | Clifton | 244/135 B |
| 2,806,665 | 9/1957 | Gibson | 244/135 B |
| 3,101,921 | 8/1963 | Price | 244/135 B |
| 3,409,253 | 11/1968 | Berg et al. | 244/135 |
| 4,026,503 | 5/1977 | Rhodes | 244/135 |
| 4,214,721 | 7/1980 | Burhans, Jr. et al. | 244/135 |
| 4,776,537 | 10/1988 | Garside et al. | 244/135 |
| 4,948,070 | 8/1990 | Lyman | 244/135 |
| 5,158,252 | 10/1992 | Sakurai | 244/214 |
| 5,222,699 | 6/1993 | Albach et al. | 244/213 |
| 5,845,879 | 12/1998 | Jensen | 244/135 R |

FOREIGN PATENT DOCUMENTS 45199 1/1992 Japan .

*Primary Examiner*—Galen L. Barefoot
*Attorney, Agent, or Firm*—Terry J. Anderson; Karl J. Hoch, Jr.

[57] ABSTRACT

A variable displacement fuel tank for aircraft is provided. The variable displacement fuel tank may be disposed within an upper medial portion (12) of a fuselage (18) of an aircraft (10). In one embodiment, a variable displacement fuel tank (20) includes a fuel bladder (22) adapted to contain fuel and a plurality of panels (30, 34, and 36) coupled to the fuselage (18) and acting on the fuel bladder (22) to restrain and control the shape of the fuel bladder (22). The variable displacement fuel tank (20) also include a power drive system (26) that operates to move the plurality of panels (30, 34, and 36) through a continuum of positions between fully deployed and stowed in order to maintain substantially zero ullage within the fuel bladder (22).

30 Claims, 5 Drawing Sheets

10 20 36 34 16 30 14 19 22 18 12

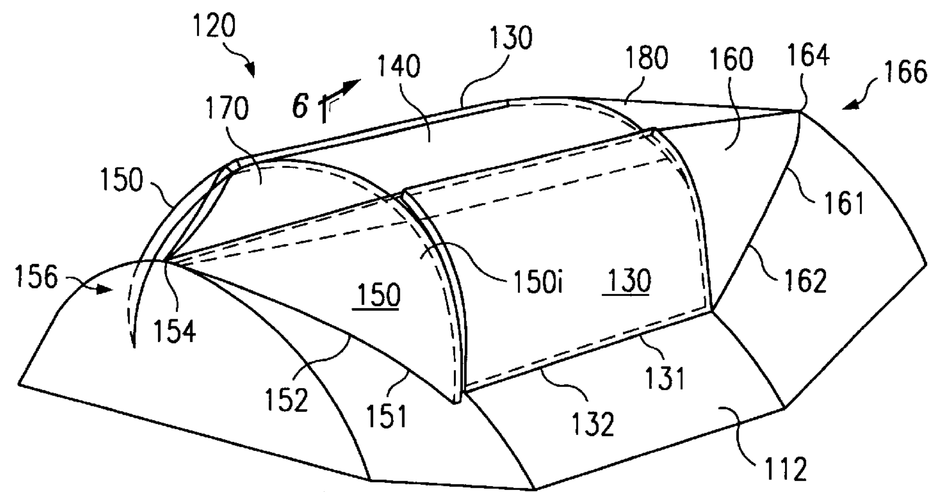
FIG. 5
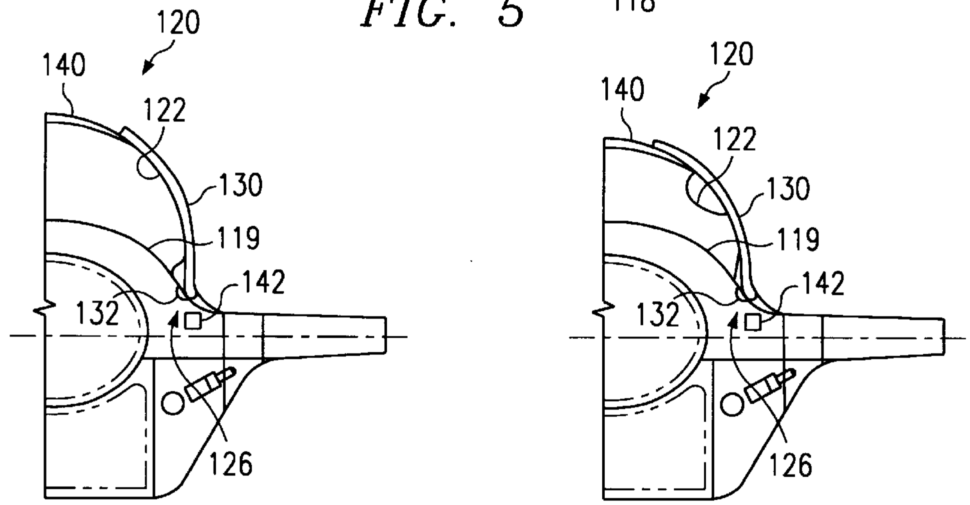
FIG. 6A
FIG. 6B
FIG. 6C

VARIABLE DISPLACEMENT FUEL TANK FOR AIRCRAFT

TECHNICAL FIELD OF THE INVENTION

The present invention relates to aircraft fuel tanks, and in particular to a variable displacement fuel tank for aircraft.

BACKGROUND OF THE INVENTION

It is common practice to increase the range of aircraft by incorporating a drop fuel tank under each wing of the aircraft. The aircraft takes off with filled wing drop tanks and flies to a destination using the fuel in the drop tanks. The empty drop tanks are then jettisoned to allow the aircraft to operate at its maximum performance level. The drop tanks are jettisoned because of they generally reduce the performance of the aircraft. For example, drop tanks increase the aerodynamic drag on the aircraft and increase the load on the wings. The costs associated with replacing the jettisoned drop tanks is prohibitive. In addition, the logistics associated with storing, maintaining, and transporting the number of drop tanks required for a combat situation is extremely difficult.

To eliminate the problems associated with drop tanks, various permanent variable displacement fuel tanks have been proposed. These proposed tanks generally rely on fuel pressure to expand the tank. These proposed tanks also relied upon elastomeric bladders or a system of lanyards or webs to vary the size and shape of the fuel tank. Approaches such as these make it difficult to manage the fuel, as induced acceleration and inertial effects tend to move the fuel load in an unpredictable manner. Uncontrolled variations in the fuel load center of mass are generally unfavorable in controlling an aircraft.

In addition, the proposed variable displacement fuel tanks are not particularly suitable for use in modern high density design aircraft. The aerodynamic and space requirements for such modern aircraft has made the use of permanent variable displacement fuel tanks very difficult. For example, modern high density design aircraft require careful placement of the permanent variable displacement fuel tanks and control of the shape of the tank under all fuel load conditions to prevent fuel inertia loads from compromising the performance of the aircraft. In addition, particular attention must be given to any external portion of the tank to avoid excessive drag and aerodynamic loads.

SUMMARY OF THE INVENTION

Accordingly, a need has arisen for an improved variable displacement fuel tank for aircraft. The present invention provides a variable displacement fuel tank for aircraft that substantially eliminates or reduces problems associated with prior methods and systems.

In accordance with one embodiment of the present invention, an aircraft having a fuselage having an upper medial portion rearwardly of a cockpit portion and forwardly of a tail portion includes a variable displacement fuel tank received on the upper medial portion of the fuselage. The fuel tank has a flexible bladder adapted to contain fuel, at least two substantially rigid bladder control panels attached to the fuselage and coacting with the bladder to restrain and control the shape of the bladder throughout a range of displacements between full and empty, and a power drive means coupled to the bladder control panels for pivoting the bladder control panels through a continuum of positions between a fully deployed position and a stowed position corresponding, respectively, to the full and empty displacements of the bladder so as to maintain the tank at substantially zero ullage. The bladder and bladder control panels are configured and positioned relative to each other and to the medial portion of the fuselage, in the empty state of the tank and the stowed position of the panels, such that the fuel tank conforms to clean aerodynamic non-expanded lines of the surfaces of the upper medial portion of the fuselage adjacent the tank.

The tank may also include one or more substantially rigid bladder cover panels engaging the bladder and coacting with the bladder control panels to supplement the control and restraint of the bladder provided by the bladder control panels.

The tank is generally disposed within a recess in the upper medial portion of the fuselage. In one embodiment, the bladder control panels and one or more cover panels close the recess and form substantially rigid skin surfaces fair to adjacent skin surfaces of the upper medial portion of the fuselage when the bladder is empty and the bladder control panels are in the stowed position.

In one embodiment of the present invention, a front bladder control panel overlies a front portion of the bladder and is attached at its front end to the fuselage for pivotal movement about a front transverse axis. A power drive device pivots the front bladder control panel between fully deployed and stowed positions corresponding, respectively, to the full and empty states of the bladder so as to maintain the tank at substantially zero ullage. A rear bladder control panel overlies a rear portion of the bladder and is pivotally attached to the fuselage adjacent the rear end for pivotal movement about a rear transverse axis. A power drive device pivots the rear bladder control panel about the rear pivot axis between fully deployed and stowed positions corresponding, respectively, to the full and empty states of the bladder so as to maintain the tank at substantially zero ullage. A substantially rigid top cover panel overlies a medial portion of the bladder and has a front portion and a rear portion. The front bladder control panel associates with the front portion of the top cover panel in sliding relation, and the front end of the rear bladder control panel associates with the rear portion of the top cover panel in sliding relation. As the front and rear panels retract, the top cover panel is also retracted toward the fuselage. In the full state of the tank and the fully deployed position of the front and rear panels, the side edges of the front and rear panels and the top cover are spaced apart from surfaces of the fuselage adjacent the tank, and side portions of the bladder extend generally downwardly from the side edges of the front and rear panels and the top cover to the surface of the fuselage adjacent the tank. In the empty state of the tank and the stowed position of the bladder control panels, the front and rear bladder control panels and the top bladder cover panel form skins that are fair to skin surfaces of the upper medial surfaces of the fuselage adjacent the tank.

In another arrangement, a pair of side bladder control panels are pivotally mounted in symmetrical relationship to the longitudinal axis along outer side edges for pivotal movement about pivot axes substantially parallel to the longitudinal axis of the fuselage. The side bladder control panels are pivotable inwardly and downwardly toward the longitudinal axis of the fuselage to overlie an upper wall portion of the bladder in a stowed position and pivotable upwardly and outwardly away from the longitudinal axis and abutting side walls of the bladder laterally in a fully deployed position. Each bladder control panel is driven by a power drive device through a continuum of positions between fully deployed and stowed so as to maintain the tank at substantially zero ullage. A plurality of substantially rigid bladder cover panels are received over the bladder and coupled to the side bladder control panels. The bladder cover panels include a plurality of front cover panels, a plurality of rear cover panels, and a medial top cover panel. The cover panels are substantially coextensive with parts of the outer wall portion of the bladder that are not engaged by the side bladder control panels. Accordingly, in this embodiment, the side bladder control panels and cover panels form a substantially rigid cover over the outer wall portion of the bladder throughout the complete range of displacement of the bladder.

In yet another embodiment, a pair of side bladder control panels are pivotally mounted in symmetrical relationship to the longitudinal axis of the fuselage along outer side edges for pivotal movement about pivot axes parallel to the longitudinal axis of the fuselage. The side control panels are joined to margins of the upper wall portion of the bladder and abutting side portions of the bladder laterally in the fully deployed position and are pivotable outwardly with respect to each other in the stowed position such that in the empty state of the bladder and stowed positions of the bladder control panels the upper wall portion of the bladder is extended outwardly and displaced downwardly by the side bladder control panels and forms a skin surface of the tank that is fair to adjacent skin surfaces of the upper medial portion of the fuselage. Each control panel is moved to a continuum of positions between the deployed and stowed positions by a power drive device so as to maintain the tank at substantially zero ullage.

Technical advantages of the present invention include providing a variable displacement fuel tank that is controlled in all fuel level states. In particular, the fuel tank maintains substantially zero ullage for all variations of the fuel level in the bladder, thereby minimizing any shifting of the fuel during operation of the aircraft at maximum performance.

Another technical advantage of the present invention includes providing a variable displacement fuel tank that is positioned within the aircraft in a location that is not generally needed for other systems, such as armament carriers.

Another technical advantage of the present invention is that the requirement for complicated controls, such as required for dual tanks to maintain load balance is not required. A further technical advantage is that the variable displacement fuel tank is not substantially distorted during operation of the aircraft at maximum performance parameters.

Still another technical advantage is that the present invention provides good aerodynamic characteristics when the fuel tank is full or partially full, and aerodynamic characteristics generally comparable to a similar aircraft without the tank when the tank is empty.

Other technical advantages of the present invention will be readily apparent to one skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like features, in which:

FIG. 5 is a perspective drawing illustrating the variable displacement fuel tank of FIG. 4;

FIGS. 6A, 6B, and 6C are schematic half cross-sectional views of the variable displacement fuel tank of FIG. 5 taken along line 6—6, showing the variable displacement fuel tank in the fully deployed, partially deployed, and stowed positions, respectively;

DETAILED DESCRIPTION OF THE INVENTION

Figure 1:
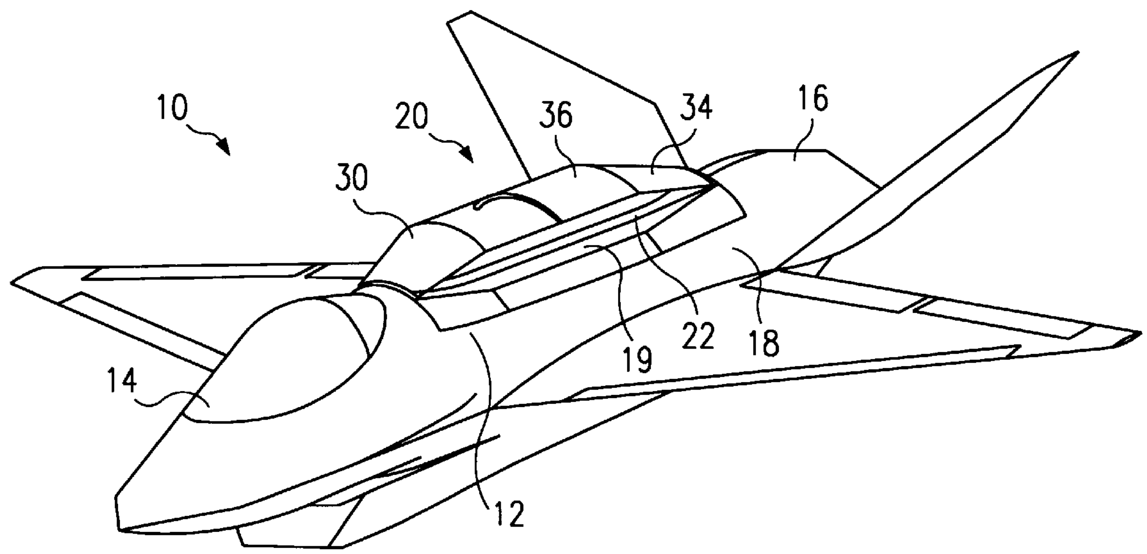
FIG. 1 is a perspective drawing illustrating an aircraft having a variable displacement fuel tank in accordance with one embodiment of the present invention.

FIGS. 1 through 9C illustrate various embodiments of a variable displacement fuel tank for an aircraft. The variable displacement fuel tank of the present invention is located above a medial portion of an aircraft fuselage and includes a flexible fuel bladder. The shape and volume of the fuel bladder is constrained and controlled by a number of substantially rigid panels that partially or completely surround the fuel bladder. A power drive system operates the panels through a range of positions ranging from stowed to fully deployed. The range of positions allows the fuel bladder to be maintained at substantially zero ullage. In addition, the variable displacement fuel tank will not substantially affect the aerodynamics of the aircraft even in the fully deployed position.

In accordance with one embodiment of the present invention, as shown in FIGS. 1 through 3C, an aircraft 10 includes a variable displacement fuel tank 20 mounted within a top medial portion 12 of a fuselage 18 rearward of a cockpit portion 14 and forward of a tail portion 16. The top medial portion 12 of the fuselage 18 may include a shallow recess 19 formed within the fuselage 18. The fuselage 18 may also include a lower floor portion 24 that forms a portion of the shallow recess 19. In addition, the fuselage 18 may include a side flange wall 44 that forms a portion of the recess 19.

The tank 20 includes a flexible fuel bladder 22 located in the shallow recess 19. The fuel bladder 22 is generally fabricated from a flexible, but substantially inelastic material. For example, the fuel bladder 22 may be fabricated from a “KEVLAR” or “SPECTRA” woven mat that is impregnated with a flexible, fluid impermeable polymeric material. It will be understood that the fuel bladder 22 may be fabricated from any suitable material without departing from the scope of the present invention.

Figure 2:
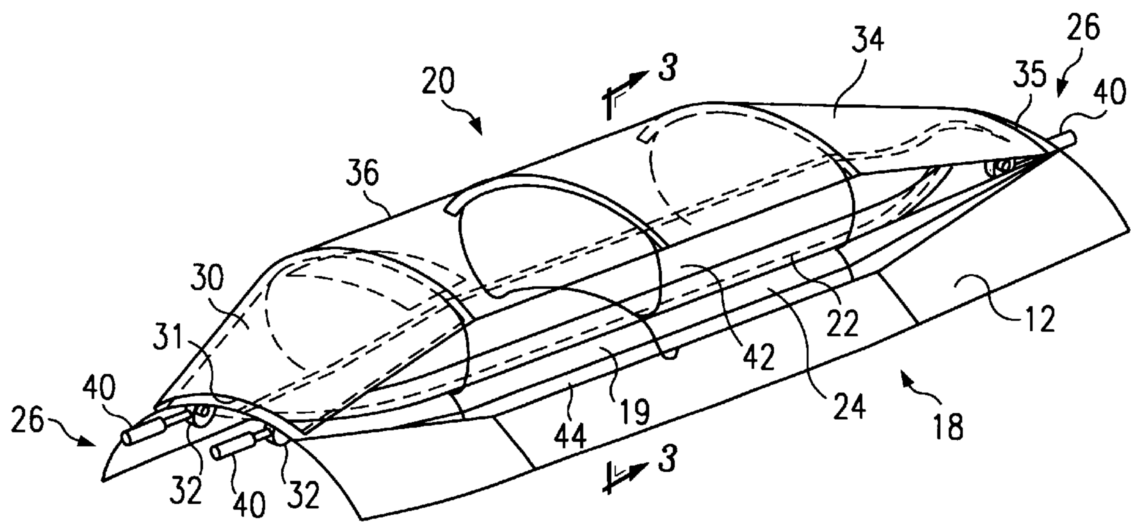
FIG. 2 is a perspective view illustrating the variable displacement fuel tank of FIG. 1.

In one embodiment, as illustrated in FIG. 2, a substantially rigid front bladder control panel 30 is pivotally coupled at a front edge 31 to the fuselage 18 by a pivot fitting 32 for movement about an axis that is substantially orthogonal to a longitudinal axis of the fuselage 18. Similarly, a substantially rigid rear bladder control panel 34 is pivotally coupled at a rear edge 35 to the fuselage 18 to move about a rear pivot axis. The front edge 31 of the front bladder control panel 30 and the rear edge 35 of the rear bladder control panel 34 may relate slidably with the adjacent surfaces of the fuselage 18. It will be understood that the front and rear bladder control panels, 30 and 34, may be otherwise coupled to the fuselage 18 without departing from the scope of the present invention.

In this embodiment, a substantially rigid top cover panel 36 is coupled to an upper wall portion 38 of the fuel bladder 22 to help restrain and control the shape of the fuel bladder 22. The front and rear bladder control panels, 30 and 34, may also be coupled to the fuel bladder 22 to further restrain and control the shape of the fuel bladder 22. In addition, the front control panel 30 and the rear control panel 34 may be pivotally or slidably coupled to the top cover panel 36 such that the front and rear bladder control panels, 30 and 34, operate to move the top cover panel 36 through a continuum of positions between a fully deployed position and a fully stowed position. It will be understood that the front bladder control panel 30 and the rear bladder control panel 34 may be otherwise coupled to the top cover panel 34 without departing form the scope of the present invention.

The panels 30, 34, and 36 are generally fabricated from a composite material such as carbon fiber epoxy matrix and "KEVLAR" materials. It will be understood that the panels 30, 34, and 36 may be fabricated from any suitable material without departing from the scope of the present invention.

Figure 3A:
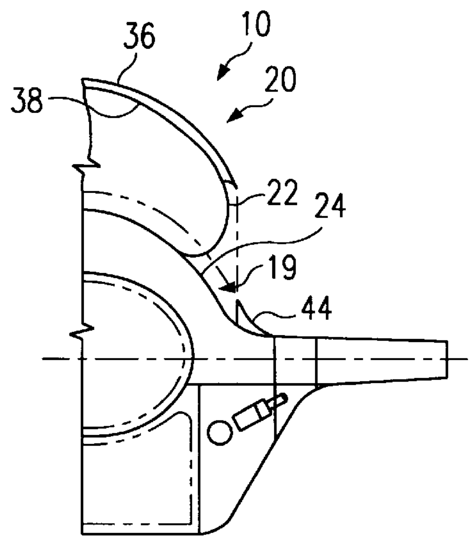
FIGS. 3A, 3B, and 3C are schematic half cross-sectional drawings illustrating the variable displacement fuel tank of FIG. 2 taken along line 3—3, showing the variable displacement fuel tank in the fully deployed, partially deployed, and stowed positions, respectively.

The variable displacement fuel tank 20, as shown in FIG. 2, also includes a control system 26. The control system 26 generally includes multiple power drive devices such as hydraulic actuators 40, to move the front and rear bladder control panels 30 and 34 through a range of positions between fully deployed and stowed. In the fully deployed position, as shown in FIGS. 1, 2 and 3A, the control panels 30 and 34 are tilted upwardly, and the top cover panel 36 is displaced upwardly relative to the fuselage 18. The control panels 30 and 34, in cooperation with the cover panel 36, provide stable aerodynamic surfaces on the exterior of the aircraft 10 that stabilize and restrain the shape of the fuel bladder 22 during operation of the aircraft 10.

Figure 3B:
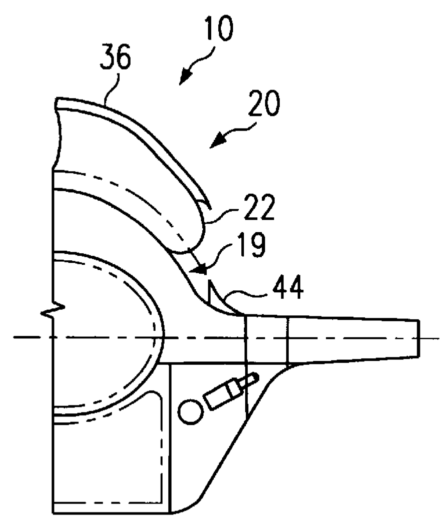
Figure 3C:
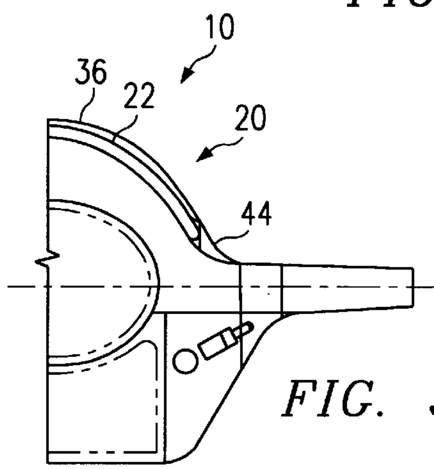

FIGS. 3A through 3C illustrate the operation of the tank 20 in the fully deployed, partially deployed, and stowed positions, respectively. FIG. 3A illustrates the fuel bladder 22 filled with fuel such that the panels 30 34, and 36 are in their respective fully deployed positions. As illustrated in FIG. 3B, fuel is expelled from the fuel bladder 22 during operation of the aircraft 10, and the actuators 40 progressively move the control panels 30 and 34 downward toward the fuselage 18, thereby lowering the top cover panel 36 toward the fuselage 18 and collapsing the fuel bladder 22. In particular, the motion of the control panels 30 and 34 in conjunction with top cover 36 reduces the volume of the fuel bladder 22 in direct relation to the fuel remaining in the fuel bladder 22. This action also reduces the aerodynamic drag of the aircraft 10 as fuel is being consumed.

The actuators 40 generally tilt the control panels 30 and 34 in tandem, maintaining substantially zero ullage within the fuel bladder 22 and the tank 20. As the panels 30, 34, and 36 move toward the stowed positions, the fuel bladder 22 is progressively collapsed to a flattened condition within the recess 19 in the fuselage 18.

As illustrated in FIG. 3C, in the stowed position of the tank 20, the panels 30, 34, and 36 present external skin surfaces that are substantially flush to the adjacent surfaces of the fuselage 18 or to a flange 44 attached to the surface of the fuselage 18. In the stowed position, the fuel tank 20 conforms to clean aerodynamic non-expanded lines of the surfaces of the upper medial portion 12 of the fuselage 18 adjacent the tank 20.

In accordance with another embodiment of the present invention, as shown in FIGS. 4 through 6C, an aircraft 110 includes a variable displacement fuel tank 120 mounted within a top medial portion 112 of a fuselage 118, rearward of a cockpit portion 114 and forward of a tail portion 116. The top medial portion 112 of the fuselage 118 may include a shallow recess 119 formed within the fuselage 118.

Figure 4:
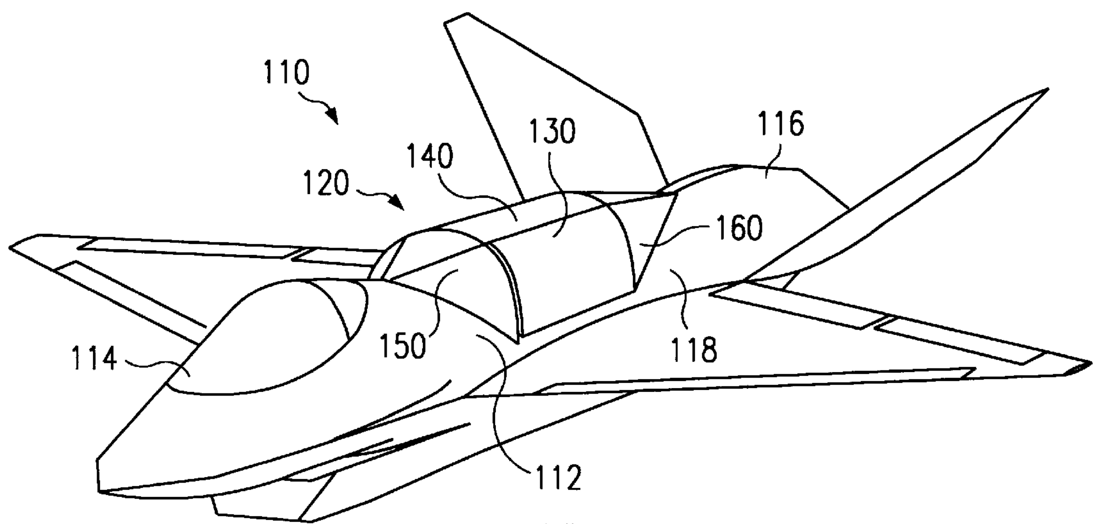
FIG. 4 is a perspective drawing of an aircraft having a variable displacement fuel tank in accordance with another embodiment of the present invention.

The tank 120 includes a flexible fuel bladder 122 located, in part, within the shallow recess 119. The flexible fuel bladder 122 may be similar to the fuel bladder 22. As illustrated in FIG. 4, the tank 120 also includes a plurality of substantially rigid side control panels 130. Each side control panel 130 may be pivotally coupled at a first edge 131 to the fuselage 118 by a pivot fitting 132 for movement about an axis that is substantially parallel to a longitudinal axis of the fuselage 118. Each side control panel 130 may include multiple panels that are coupled together to form the side control panel 130. It will be understood that the side control panels 130 may be otherwise configured and shaped without departing from the scope of the present invention.

In one embodiment, as illustrated in FIG. 5, a plurality of substantially rigid and generally triangular front control panels 150 are coupled to the fuselage 118 at a location forward of the side control panels 130. Each front cover panel 150 is pivotally coupled at a front edge 151 to the fuselage 118 by a pivot fitting 152 for movement about axes that are generally oblique to the longitudinal axes of the fuselage 118. In addition, a front vertex 154 of each front control panel 150 generally meets at a forward point 156 on the fuselage. Each front control panel 150 may include multiple panels that are coupled together to form the front control panel 150.

Similarly, a plurality of substantially rigid and generally triangular rear cover panels 160 are coupled to the fuselage 118 at a location rearward of the side control panels 130. Each rear cover panel 160 is pivotally coupled at a rear edge 161 to the fuselage 118 by a pivot fitting 162 for movement about axis that is generally oblique to the longitudinal axes of the fuselage 118. In addition, a rear vertex 164 of each rear control panel 160 generally meets at a rearward point 166 on the fuselage. Each rear control panel 160 may include multiple panels that are coupled together to form the rear control panel 160. It will be understood that the front and rear control panels, 150 and 160, may be otherwise configured and shaped without departing from the scope of the present invention.

In this embodiment, a substantially rigid medial cover panel 140 is coupled to a medial top portion of the fuel bladder 122 to help restrain and control the shape of the fuel bladder 122. The medial cover panel 140 may be slidably coupled to the side control panels 130 such that the side control panels 130 operate to move the medial cover panel 140 through a continuum of positions between a fully deployed position and a fully stowed position. It will be understood that the side control panels 130 may be otherwise coupled to the medial cover panel 140 without departing form the scope of the present invention.

Similarly, a substantially rigid and generally triangular front cover panel 170 overlying a front portion of the fuel bladder 122 is slidably coupled to the front control panels 150, and a substantially rigid and generally triangular rear cover panel 180 overlying a rear portion of the fuel bladder 122 is slideably coupled to the rear control panels 160. The front control panels 150 and the rear control panels 160 operate to move the front cover panel 170 and the rear cover panel 180 through a continuum of positions between a fully deployed position and a fully stowed position. The front cover panel 170 and the rear cover panel 180 may also be coupled to a front and rear portion of the fuel bladder, respectively, to further restrain and control the shape of the fuel bladder 122.

The variable displacement fuel tank 120, as shown in FIG. 5, also includes a control system 126. The control system 126 generally includes multiple power drive devices such as hydraulic actuators 142, to move side, front, and rear control panels 130, 150, and 160 through a range of positions between fully deployed and stowed. In the fully deployed position, as shown in FIGS. 4, 5 and 6A, the control panels 130, 150, and 160 are tilted upwardly and outwardly from the recess 119 in the fuselage 188, and the medial, front, and rear cover panels 140, 170, and 180 are displaced generally upwardly relative to the fuselage 118. The control panels 130, 150, and 160, in cooperation with the cover panels 140, 170, and 180, provide stable aerodynamic surfaces on the exterior of the aircraft 110 that stabilize and restrain the shape of the fuel bladder 122 during operation of the aircraft 110.

FIGS. 6A through 6C illustrate the operation of the tank 120 in the fully deployed, partially deployed, and stowed positions, respectively. FIG. 6A illustrates the fuel bladder 122 filled with fuel such that the control panels 130, 150, and 160 and the cover panels 140, 170, and 180 are in their respective fully deployed positions. As illustrated in FIG. 6B, fuel is expelled from the fuel bladder 122 during operation of the aircraft 110, and the actuators 142 progressively move the control panels 130, 150, and 160 downward and inward toward the fuselage 118, thereby lowering the cover panels 140, 170, and 180 toward the fuselage 118 and collapsing the fuel bladder 122. In particular, the motion of the control panels 130, 150, and 160, in conjunction with the cover panels 140, 170, and 180, reduces the volume of the fuel bladder 122 in direct relation to the fuel remaining in the fuel bladder 122. This action also reduces the aerodynamic drag of the aircraft 10 as fuel is being consumed. In addition, the control panels 130, 150, and 160 substantially surround the fuel bladder 122 throughout the entire range of conditions of the fuel bladder 122 between full and empty.

The actuators 142 generally tilt the control panels 130, 150, and 160 simultaneously and symmetrically such that substantially zero ullage is maintained within the fuel bladder 122 and the tank 120. As the panels 130, 140, 150, 160, 170, and 180 move toward the stowed positions, the fuel bladder 122 is progressively collapsed to a flattened condition within the recess 119 in the fuselage 118.

As illustrated in FIG. 6C, in the stowed position of the tank 120, the control panels 130, 150, and 160 present external skin surfaces that are substantially flush to the adjacent surfaces of the fuselage 118 or to a flange (not expressly shown) attached to the surface of the fuselage 118. In the stowed position, the fuel tank 120 conforms to clean aerodynamic non-expanded lines of the surfaces of the upper medial portion 112 of the fuselage 118 adjacent to the tank 120.

In accordance with another embodiment of the present invention, as shown in FIGS. 7 through 9C, an aircraft 210 includes a variable displacement fuel tank 220 mounted within a top medial portion 212 of a fuselage 218 rearward of a cockpit portion 214 and forward of a tail portion 216. The top medial portion 212 of the fuselage 218 may include a shallow recess 219 formed within the fuselage 218.

Figure 7:
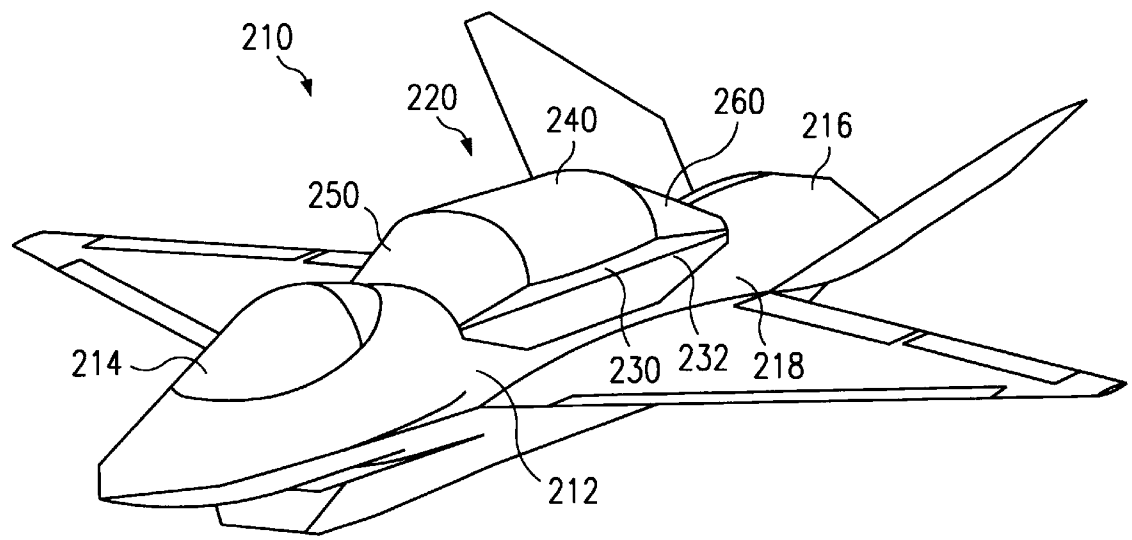
FIG. 7 is a perspective drawing illustrating an aircraft having a variable displacement fuel tank in accordance with another embodiment of the present invention.

The tank 220 includes a flexible fuel bladder 222 located in the shallow recess 219. The flexible fuel bladder 222 may be similar to the fuel bladder 22. As illustrated in FIG. 7, the tank 220 also includes a plurality of substantially rigid side control panels 230. Each side control panels 230 may be pivotally coupled at a first edge 231 to the fuselage 218 by a pivot fitting 232 for movement about axes that are substantially parallel to a longitudinal axis of the fuselage 218. It will be understood that the side control panels 230 may be otherwise configured and shaped without departing from the scope of the present invention.

Figure 8:
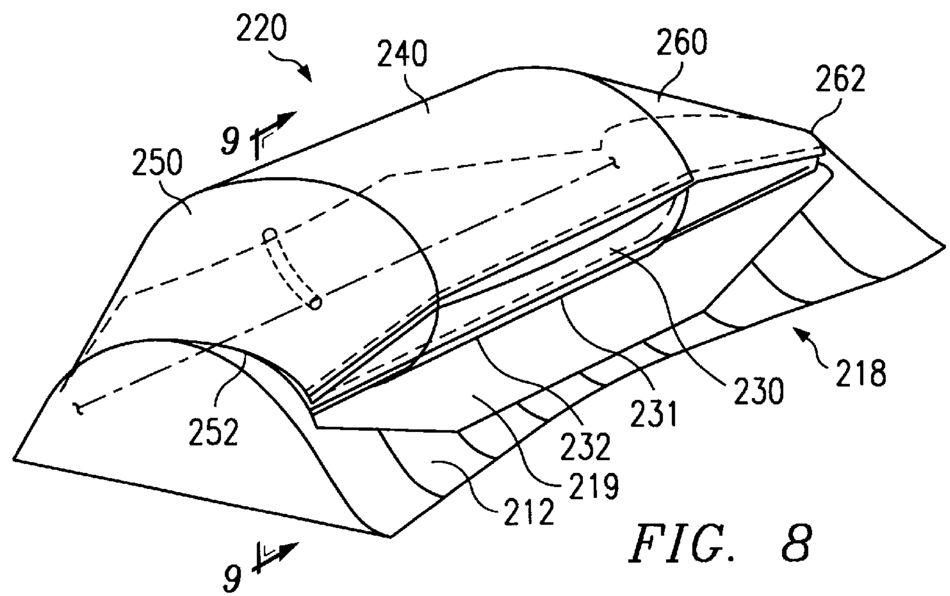
FIG. 8 is a perspective drawing illustrating the variable displacement fuel tank of FIG. 7.

In one embodiment, as illustrated in FIG. 8, a medial cover panel 240 is coupled to a medial top portion of the fuel bladder 222 to help restrain and control the shape of the fuel bladder 222. The medial cover panel 240 may be pivotally coupled to the side control panels 230 such that the side control panels 230 operate to move the medial cover panel 240 through a continuum of positions between a fully deployed position and a fully stowed position. It will be understood that the medial cover panel 240 may be otherwise coupled without departing from the scope of the present invention.

Similarly, a front cover panel 250 overlying a front portion of the fuel bladder 222 may be pivotally coupled to the side control panels 230, and a rear cover panel 260 overlying a rear portion of the fuel bladder 222 may be pivotally coupled to the rear control panels 230. The side control panels 230 operate to move the front cover panel 250 and the rear cover panel 260 through a continuum of positions between a fully deployed position and a fully stowed position.

In one embodiment, the front cover panel 250 is pivotally coupled at a front edge 252 to the fuselage 218 for movement about an axis that is substantially orthogonal to a longitudinal axis of the fuselage 218 and slidably coupled to the medial cover panel 240. In another embodiment, the front cover panel 250 is pivotally coupled to the medial cover panel 240 and slideably coupled at the front edge 252 to the fuselage 218 such that the front edge 252 slides along an axis substantially parallel to the longitudinal axis of the fuselage 218. Similarly, the rear cover panel 260 may be coupled to the medial cover panel 240 and at a rear edge 262 to the fuselage 218. It will be understood that the front and rear cover panels 250 and 260 may be otherwise coupled to the medial cover panel 240 and to the fuselage 218 without departing from the scope of the preset invention. In addition, the front cover panel 250 and the rear cover panel 260 may also be coupled to a front and rear portion of the fuel bladder 222, respectively, to further restrain and control the shape of the fuel bladder 222. It will be understood that the front cover panel 250, the medial cover panel 240, the rear cover panel 260, and the side control panels 230 may be otherwise coupled without departing from the scope of the present invention.

Figure 9A:
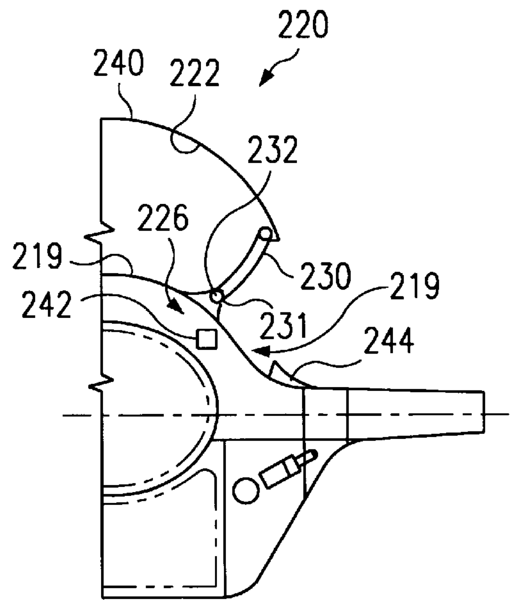
FIGS. 9A, 9B, and 9C are schematic half cross-sectional drawings illustrating the variable displacement fuel tank of FIG. 5 taken along line 9—9, showing the variable displacement fuel tank in the fully deployed, partially deployed, and stowed positions, respectively.
Figure 9B:
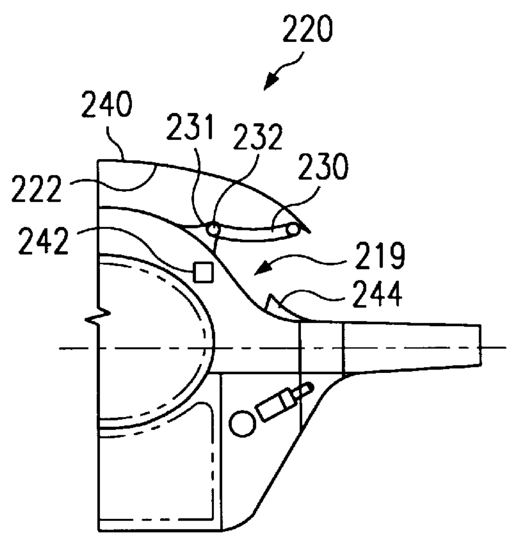
Figure 9C:
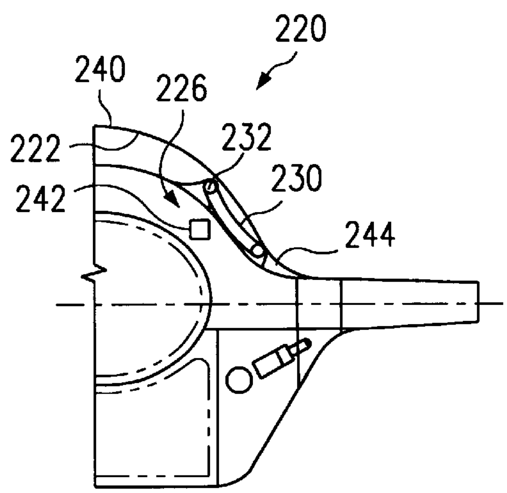

As shown in FIGS. 9A, 9B, and 9C, the medial cover panel 240 must flex through a continuum of positions between fully deployed and fully stowed. The front and rear cover panels 250 and 260 must also flex between the fully deployed and fully stowed positions. Therefore, the medial, front, and rear cover panels 240, 250, and 260 should be composed of substantially rigid, yet sufficiently flexible, material to flex between the fully deployed position, as shown in FIG. 9A, and the fully stowed position, as shown in FIG. 9C.

The variable displacement fuel tank 220, as shown in FIG. 8, also includes a control system 226. The control system 226 generally includes multiple power drive devices such as hydraulic actuators 242, to move the side control panels 230 through a range of positions between fully deployed and stowed positions. In the fully deployed position, as shown in FIGS. 7, 8 and 9A, the side control panels 230 are tilted upwardly from the recess 119 in the fuselage 218, and the cover panels 240, 250, and 260 are displaced generally upwardly, and bowed outwardly, from the fuselage 218. The side control panels 230 in cooperation with the cover panels 240, 250, and 260, provide stable aerodynamic surfaces on the exterior of the aircraft 210 that stabilize and restrain the shape of the fuel bladder 222 during operation of the aircraft 210.

FIGS. 9A through 9C illustrate the operation of the tank 220 in the fully deployed, partially deployed, and stowed positions, respectively. FIG. 9A illustrates the fuel bladder 222 filled with fuel such that the side control panels 230 and the cover panels 240, 250, and 260 are in their respective fully deployed positions. As illustrated in FIG. 9B, fuel is expelled from the fuel bladder 222 during operation of the aircraft 210, and the actuators 242 progressively move the side control panels 230 outward and downward toward the fuselage 218, thereby lowering the cover panels 240, 250, and 260 toward the fuselage 218 and collapsing the fuel bladder 222. As previously stated, the cover panels 240, 250, and 260 must flex as they move between the fully deployed position as shown in FIG. 9A, and the fully stowed position, as shown in FIG. 9C. The motion of the side control panels 230, in conjunction with the cover panels 240, 250, and 260, reduces the volume of the fuel bladder 222 in direct relation to the fuel remaining in the fuel bladder 222. In addition, the side control panels 230 cooperate with the cover panels 240, 250, and 260 to substantially surround the fuel bladder 222 throughout the entire range of conditions of the fuel bladder 222 between full and empty.

The actuators 242 generally tilt the side control panels 230 simultaneously and symmetrically such that substantially zero ullage is maintained within the fuel bladder 222 and the tank 220. As the panels 230, 240, 250, and 260 move toward the stowed positions, the fuel bladder 222 is progressively collapsed to a flattened condition within the recess 219 in the fuselage 218.

As illustrated in FIG. 9C, in the stowed position of the tank 220, the cover panels 240, 250, and 260 present external skin surfaces that are substantially flush to the adjacent surfaces of the fuselage 218 or to a flange 244 attached to the surface of the fuselage 218. In the stowed position, the fuel tank 220 conforms to clean aerodynamic non-expanded lines of the surfaces of the upper medial portion 212 of the fuselage 218 adjacent to the tank 220.

Although the present invention has been described with several embodiments, various changes and modifications may be suggested to one skilled in the art. It is intended that the present invention encompass such changes and modifications that follow within the scope of the appended claims.

What is claimed is:

1. A variable displacement fuel tank for an aircraft, the variable displacement fuel tank comprising:

a flexible fuel bladder adapted to contain fuel;

a plurality of substantially rigid panels coupled to the fuselage and acting on the fuel bladder to restrain and control the shape of the fuel bladder;

a power drive system acting on the plurality of panels to move the panels through a continuum of positions between fully deployed and fully stowed to maintain substantially zero ullage within the fuel bladder; and wherein the variable displacement fuel tank is disposed, in part, within a recess formed in an upper medial portion of a fuselage of the aircraft.

2. The variable displacement fuel tank of claim 1, wherein the plurality of panels substantially surround the fuel bladder between fully deployed and fully stowed positions.

3. The variable displacement fuel tank of claim 1, wherein the plurality of panels comprises:

at least one cover panel;

at least one control panel; and wherein the cover panel and the control panel cooperate to control and restrain the fuel bladder.

4. The variable displacement fuel tank of claim 1, wherein the plurality of panels comprise:

a front control panel pivotally coupled at a front edge to the fuselage;

a rear control panel pivotally coupled at a rear edge to the fuselage; and a top cover panel coupled to the fuel bladder and operatively engaged with the front and rear control panels.

5. The variable displacement fuel tank of claim 4, wherein the top cover is slidably engaged with both the front control panel and the rear control panel.

6. The variable displacement fuel tank of claim 4, wherein the front control panel, the rear control panel, and the top cover are substantially flush with the fuselage when the plurality of panels are in the fully stowed position.

7. The variable displacement fuel tank of claim 1, wherein the plurality of panels comprise:

a plurality of side control panels pivotally coupled to the fuselage;

a plurality of front control panels pivotally coupled to the fuselage;

a plurality of rear control panels pivotally coupled to the fuselage;

a medial cover panel coupled to the fuel bladder and operatively engaged with the side control panels;

a front cover panel overlying a front portion of the fuel bladder and operatively engaged with the front control panels; and a rear cover panel overlying a rear portion of the fuel bladder and operatively engaged with the rear control panels.

8. The variable displacement fuel tank of claim 7, wherein the medial cover panel is slidably engaged with the side control panels, the front cover panel is slidably engaged with the front control panels, and the rear cover panel is slidably engaged with the rear control panels.

9. The variable displacement fuel tank of claim 7, wherein the front and rear control panels are substantially triangular, and wherein a front vertex of each front control panel generally meets at a forward point on the fuselage, and a rear vertex of each rear control panel generally meets at a rearward point on the fuselage.

10. The variable displacement fuel tank of claim 7, wherein the side control panels, the front control panels, and the rear control panel are substantially flush with the fuselage when the plurality of panels are in the fully stowed position.

11. The variable displacement fuel tank of claim 1, wherein the plurality of panels comprise:

a plurality of side control panels pivotally coupled to the fuselage;

a front cover panel overlying a front portion of the fuel bladder and operatively engaged with the side control panels;

a rear cover panel overlying a rear portion of the fuel bladder and operatively engaged with the side control panels; and a medial cover panel coupled to a medial portion of the fuel bladder and operatively engaged with the side control panels.

12. The variable displacement fuel tank of claim 11, wherein the front cover panel, the rear cover panel, and the medial cover panel are sufficiently flexible to bend between the fully deployed and fully stowed positions.

13. The variable displacement fuel tank of claim 12, wherein each cover panel has a side edge pivotally coupled to the side control panels such that the side control panels operate to move the cover panels between the fully deployed and fully stowed positions.

14. The variable displacement fuel tank of claim 12, wherein the front cover panel and the rear cover panel are slidably engaged with the medial cover panel.

15. The variable displacement fuel tank of claim 12, wherein the front cover panel, the rear cover panel, and the medial cover panel are substantially flush with the fuselage when the variable displacement fuel tank is in the fully stowed position.

16. A variable displacement fuel tank disposed, in part, within a recess located in an upper medial portion of a fuselage of an aircraft, the variable displacement fuel tank comprising:

a flexible fuel bladder adapted to contain fuel;

a substantially rigid front control panel overlying a front portion of the fuel bladder and pivotally coupled at a front edge to the fuselage;

a substantially rigid rear control panel overlying a rear portion of the fuel bladder and pivotally coupled at a rear edge to the fuselage;

a substantially rigid top cover panel coupled to a medial portion of the fuel bladder and operatively engaged with the front and rear control panels;

the front control panel and the rear control panel being operable to move the top cover panel between a fully deployed position and a fully stowed position;

a power drive system operable to move the front control panel and the rear control panel through a continuum of positions between a fully deployed position and a fully stowed position such that the front control panel, the rear control panel, and the top cover panel cooperate to restrain and control the shape of the fuel bladder to maintain substantially zero ullage within the fuel bladder; and wherein the front control panel, the rear control panel, and the top cover panel are substantially flush with a flange attached to the fuselage when the control panels are in the fully stowed position.

17. The variable displacement fuel tank of claim 16, wherein the front edge of the front control panel and the rear edge of the rear control panel are slidably engaged with the fuselage.

18. The variable displacement fuel tank of claim 16, wherein the power drive system includes hydraulic actuators.

19. A variable displacement fuel tank disposed, in part, within a recess located in an upper medial portion of a fuselage of an aircraft, the variable displacement fuel tank comprising:

a flexible fuel bladder adapted to contain fuel;

a plurality of substantially rigid side control panels, each side control panel pivotally coupled at a first edge to the fuselage;

a plurality of substantially rigid and substantially triangular front control panels and rear control panels, each front control panel and each rear control panel having a first edge pivotally coupled to the fuselage;

a front vertex of each front control panel generally meeting at a forward point on the fuselage, and a rear vertex of each rear control panel generally meeting at a rearward point on the fuselage;

a substantially rigid medial cover panel coupled to the fuel bladder and slidably engaged with the side control panels;

a substantially rigid front cover panel overlying a front portion of the fuel bladder and slidably engaged with the front control panels;

a substantially rigid rear cover panel overlying a rear portion of the fuel bladder and slidably engaged with the rear control panels;

the plurality of side control panels, front control panels, and rear control panels being operable to move the front cover panel, the rear cover panel, and the medial cover panel between fully deployed and fully stowed positions;

a power drive system operable to move the plurality of side control panels, front control panels, and rear control panels through a continuum of positions between a fully deployed position and a fully stowed position such that the plurality of control panels and the cover panels cooperate to restrain and control the shape of the fuel bladder to maintain substantially zero ullage within the fuel bladder;

wherein the plurality of control panels and the cover panels substantially surround and control the shape of the fuel bladder between fully deployed and fully stowed positions of the control panels; and wherein the plurality of control panels substantially enclose the cover panels within the recess in the fuselage when the control panels are in the fully stowed position.

20. The variable displacement fuel tank of claim 19, wherein the plurality of side control panels are coupled to the fuel bladder in order to further control the shape of the fuel bladder.

21. The variable displacement fuel tank of claim 19, wherein the power drive system includes hydraulic actuators.

22. A variable displacement fuel tank disposed, in part, within a recess located in an upper medial portion of a fuselage of an aircraft, the variable displacement fuel tank comprising:

a flexible fuel bladder adapted to contain fuel;

a plurality of substantially rigid side control panels, each side control panel pivotally coupled at a first edge to the fuselage;

a front cover panel overlying a front portion of the fuel bladder and pivotally coupled to the side control panels;

a rear cover panel overlying a rear portion of the fuel bladder and pivotally coupled to the side control panels;

a medial cover panel coupled to a medial portion of the fuel bladder, the medial cover panel pivotally coupled to the side control panels and slidably engaged with the front cover panel and the rear cover panel;

the plurality of side control panels being operable to move the front cover panel, the rear cover panel, and the medial cover panel between fully deployed and fully stowed positions;

a power drive system having hydraulic actuators operable to move the plurality of side control panels through a continuum of positions between a fully deployed position and a fully stowed position such that the plurality of side control panels and the cover panels cooperate to restrain and control the shape of the fuel bladder to maintain substantially zero ullage within the fuel bladder;

wherein the front, rear, and medial cover panels are substantially rigid, but sufficiently flexible to bend between the fully deployed and fully stowed positions;

wherein the plurality of side control panels and the cover panels substantially surround and control the shape of the fuel bladder between the fully deployed and fully stowed positions of the side control panels; and wherein the front, rear, and medial cover panels are substantially flush with a flange attached to the fuselage when the side control panels are in the fully stowed position.

23. The variable displacement fuel tank of claim 22, wherein a front edge of the front cover panel and a rear edge of the rear cover panel are slidably engaged with the fuselage.

24. The variable displacement fuel tank of claim 22, wherein the side control panels are coupled to the fuel bladder in order to further control the shape of the fuel bladder.

25. The variable displacement fuel tank of claim 22, wherein the power drive system includes hydraulic actuators.

26. An aircraft having a variable displacement fuel tank disposed, in part, within a recess located in an upper medial portion of a fuselage of the aircraft, the variable displacement fuel tank comprising:

a flexible fuel bladder adapted to contain fuel;

a plurality of substantially rigid panels coupled to the fuselage and acting on the fuel bladder to restrain and control the shape of the fuel bladder; and a power drive system acting on the plurality of panels to move the panels through a continuum of positions between fully deployed and stowed to maintain substantially zero ullage within the fuel bladder.

27. The aircraft of claim 26, wherein the plurality of panels comprise:

a front control panel pivotally coupled at a front edge to the fuselage;

a rear control panel pivotally coupled at a rear edge to the fuselage; and a top cover panel coupled to the fuel bladder and operatively engaged with the front and rear control panels.

28. The aircraft of claim 26, wherein the plurality of panels comprise:

a plurality of side control panels pivotally coupled to the fuselage;

a plurality of front control panels pivotally coupled to the fuselage;

a plurality of rear control panels pivotally coupled to the fuselage;

a medial cover panel coupled to the fuel bladder and operatively engaged with the side control panels;

a front cover panel overlying a front portion of the fuel bladder and operatively engaged with the front control panels; and a rear cover panel overlying a rear portion of the fuel bladder and operatively engaged with the rear control panels.

29. The aircraft of claim 26, wherein the plurality of panels comprise:

a plurality of side control panels pivotally coupled to the fuselage;

a front cover panel overlying a front portion of the fuel bladder and operatively engaged with the side control panels;

a rear cover panel overlying a rear portion of the fuel bladder and operatively engaged with the side control panels; and a medial cover panel coupled to a medial portion of the fuel bladder and operatively engaged with the side control panels.

30. The aircraft of claim 29, wherein the front cover panel, the rear cover panel, and the medial cover panel are sufficiently flexible to bend between the fully deployed and fully stowed positions.

* * * * *